(12) United States Patent
Sakoske et al.

(10) Patent No.: US 10,047,004 B2
(45) Date of Patent: Aug. 14, 2018

(54) METHOD OF FORMING DURABLE GLASS ENAMEL

(71) Applicant: Ferro Corporation, Mayfield Heights, OH (US)

(72) Inventors: George E. Sakoske, Independence, OH (US); Phil Maitland, Eccleshall (GB); Dietrich Speer, Lengeselbold (DE); Walter Frank, Rüsselsheim (DE)

(73) Assignee: Ferro Corporation, Mayfield Heights, OH (US)

( * ) Notice: Subject to any disclaimer, the term of this patent is extended or adjusted under 35 U.S.C. 154(b) by 405 days.

(21) Appl. No.: 14/905,838

(22) PCT Filed: Jun. 17, 2014

(86) PCT No.: PCT/US2014/042661
§ 371 (c)(1),
(2) Date: Jan. 18, 2016

(87) PCT Pub. No.: WO2015/009377
PCT Pub. Date: Jan. 22, 2015

(65) Prior Publication Data
US 2016/0185657 A1    Jun. 30, 2016

Related U.S. Application Data

(60) Provisional application No. 61/847,100, filed on Jul. 17, 2013.

(51) Int. Cl.
| | | |
|---|---|---|
| *B32B 9/00* | (2006.01) |
| *B32B 17/06* | (2006.01) |
| *C03C 17/04* | (2006.01) |
| *C03C 3/062* | (2006.01) |
| *C03C 3/066* | (2006.01) |
| *C03C 3/089* | (2006.01) |
| *C03C 8/04* | (2006.01) |
| *C03C 8/06* | (2006.01) |
| *C03C 8/14* | (2006.01) |
| *C03C 8/18* | (2006.01) |
| *C03C 8/20* | (2006.01) |
| *C03C 17/34* | (2006.01) |
| *C23D 5/00* | (2006.01) |
| *C03B 23/00* | (2006.01) |
| *C03C 17/36* | (2006.01) |

(52) U.S. Cl.
CPC .......... *C03C 17/04* (2013.01); *C03B 23/0066* (2013.01); *C03C 3/062* (2013.01); *C03C 3/066* (2013.01); *C03C 3/089* (2013.01); *C03C 8/04* (2013.01); *C03C 8/06* (2013.01); *C03C 8/14* (2013.01); *C03C 8/18* (2013.01); *C03C 8/20* (2013.01); *C03C 17/3411* (2013.01); *C03C 17/3644* (2013.01); *C23D 5/00* (2013.01); *C03C 2204/04* (2013.01); *C03C 2205/02* (2013.01); *C03C 2218/119* (2013.01)

(58) Field of Classification Search
None
See application file for complete search history.

(56) References Cited

U.S. PATENT DOCUMENTS

| | | |
|---|---|---|
| 5,725,919 A | 3/1998 | Roberts et al. |
| 2003/0059600 A1 | 3/2003 | Gazo et al. |
| 2012/0196126 A1 | 8/2012 | Axtell, III et al. |
| 2012/0282407 A1 | 11/2012 | Singh et al. |

FOREIGN PATENT DOCUMENTS

| | | |
|---|---|---|
| EP | 2368859 A1 | 9/2011 |
| GB | 939962 | 10/1963 |

OTHER PUBLICATIONS

International Search Report for corresponding PCT/US2014/042661 dated Oct. 16, 2014, two pages.

*Primary Examiner* — Robert T Butcher
(74) *Attorney, Agent, or Firm* — Rankin, Hill & Clark LLP

(57) ABSTRACT

A multi-layer glass enamel is disclosed. The various layers of the enamel are included to provide certain performance characteristics to the enamel. The components of each layer can be individually adjusted to tailor the performance characteristics influenced by that layer without changing the influence of the remaining layers.

15 Claims, 2 Drawing Sheets

METHOD OF FORMING DURABLE GLASS ENAMEL

FIELD OF THE INVENTION

The present subject matter relates to glass enamels and method of forming thereof.

BACKGROUND

Durable glass enamel compositions are known in the art. These glass (or ceramic) enamel compositions are known to be useful for forming decorative coatings for glassware, chinaware, architectural glass and the like. They are especially useful in forming colored borders around glass sheets used for automotive windshields, sidelights and backlights. These colored borders enhance the appearance as well as prevent UV degradation of underlying adhesives.

In general, these enamel compositions consist essentially of a glass frit, a colorant and an organic vehicle or carrier. They are applied to a desired substrate in a single layer and subsequently fired to burn off the organic vehicle and fuse the frit, thus bonding the enamel coating to the substrate. Problems and shortcomings associated with conventional coatings have been dealt with by adjusting the composition of the glass enamels. These adjustments to the composition alter the performance and usually increase the cost of the resulting glass enamels. Further, while these adjustments to the compositions may improve one performance characteristic, they can potentially negatively affect another, or otherwise increase material and/or production costs. Thus a balancing of needs, cost, and performance is required when altering the composition of traditional glass enamels.

For example, the use of enamel coatings may negatively impact mechanical properties of the substrate, such as strength and durability. A related problem occurs when increasing opacity of the coating. Opacity depends on the thickness of the enamel and the pigment loading therein. This need arises in the automotive glass, where a highly opaque border is coated to the glass in order to cover and protect underlying adhesive from UV degradation. High pigment loading compromises the strength and durability of the coating and consequently, a relatively large amount of enamel required, with a corresponding increase in cost.

Another problem arises when the substrate regions require different opacity, such as glass required to have a slightly opaque middle section and a dark border. To achieve this effect it is generally necessary to make at least two passes, one covering the entire substrate, and the second covering only the border in order to achieve a thicker coating along the periphery. This process is inefficient and costly.

A further problem with conventional coatings is associated with glass sheets for automotive use, where the glass is generally coated by screen printing with the ceramic enamel composition and then subjected to a forming process at elevated temperatures. During this treatment the enamel melts and fuses to the glass substrate and then the glass is formed into a desired final shape by forming dies. It is known that low viscosity coatings tended to adhere at high temperatures to the materials covering the forming die.

Various approaches have thus been suggested in order to facilitate the forming of glass sheets with ceramic enamel coated thereon in order to avoid the enamel adhering to the forming die. The goal of these various approaches was to increase the toleration of the enamels to the elevated temperatures for bending or forming, and to repeated contact between the glass sheet and the covered forming die. For example, the use of metal oxide powders, including bismuth oxide-containing formulations have been proposed. Certain enamels comprising oxidizable metals or other components which form crystalline phases cause weaknesses in the substrate and adverse changes in the mechanical properties of the automotive glass. Specifically, high thermal expansion systems produce a weak glass substrate, such as when lithium is present, and have poor silver bleed-through properties, as well as inadequate anti-stick properties.

As a further problem, a number of previous ceramic enamel systems employ a lead-containing glass frit. For environmental considerations it is desirable to avoid the use of any lead-containing system. Also, while some of the prior enamel systems may perform fairly well in conventional glass forming processes, some are not satisfactory for use in the newly-developed "deep bend" processes for forming highly curved automotive glass parts.

Various approaches have also been suggested in order to provide glass enamels with durable and adequate resistance to certain chemical agents, which they may contact. Certain components incorporated into an enamel to achieve these goals increase the cost of the enamels and can require higher firing temperatures for the enamels, thus increasing production costs. To this end, any pigment component included in the glass enamels must also be limited because increasing the pigment content of a glass enamel to produce vivid colors, decreases the durability of the enamel and increases the firing temperature. Also the bonding strength to the substrate will decrease as pigments are increased.

SUMMARY OF THE INVENTION

The difficulties and drawbacks associated with previously known glass enamels and coating strategies are overcome in the present enamels and related combinations and methods. The present subject matter provides multi-layered glass enamel compositions, a method for forming the enamels, and substrates coated therewith.

The present subject matter relates to multi-layered glass and ceramic enamel compositions and methods of forming multi-layered enamels on substrates.

In one aspect, the present subject matter provides an enamel comprising an interface layer for bonding the enamel to a substrate, an opaque layer over the interface layer, and a durable layer over the opaque layer. The enamel has an exposed portion after being bonded to the substrate and the durable layer defines the exposed portion of the multi-layer enamel.

In another aspect, the present subject matter provides an enamel comprising an interface layer bonded to a substrate, a filler layer over the interface layer, an opaque layer over the filler layer, a silver bleed through layer over the opaque layer, a durable layer over the silver bleed through layer, the durable layer presenting an exposed surface of the enamel, and an anti-stick layer on the durable layer.

In still another aspect, the present subject matter provides a method of forming an enamel. The method comprises depositing an interface layer to a surface of a substrate, forming an opaque layer over the interface layer, layering a durable layer over the opaque layer, and firing the layers to thereby form the enamel. The resulting enamel has an exposed surface defined by the durable layer.

In yet another embodiment, the present subject matter provides a multi-layer enamel coated substrate. The multi-layer enamel comprises an interface layer bonded to the substrate, an opaque layer over the interface layer, and a durable layer over the opaque layer. The enamel has an exposed portion and the durable layer defines the exposed portion. The substrate can be automotive glass, architectural glass, or display glass.

The present subject matter provides a multi-layered enamel and method where the individual layers can be tailored to affect the performance characteristics of the enamel as a whole, while not directly affecting the other layers of the enamel or their specific performance characteristics. The digital printing application method for the layers of the enamel provides precise control and allows for design and patterning of the enamel to a substrate.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

These, as well as other features, aspects, and advantages of the present subject matter, will be more completely understood and appreciated by referring to the following more detailed description of the exemplary embodiments of the present subject matter in conjunction with the accompanying drawings.

DETAILED DESCRIPTION OF THE EMBODIMENTS

Figure 1:
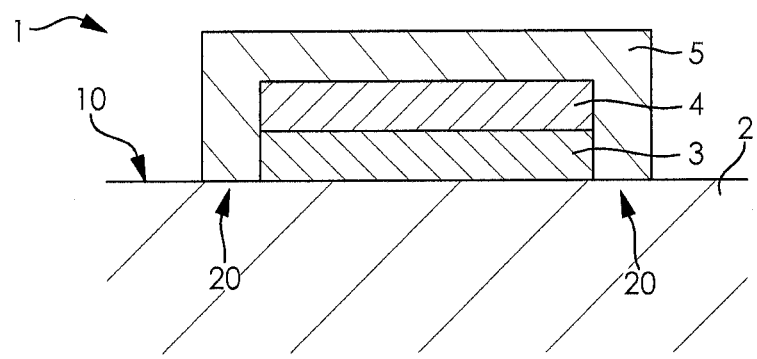
FIG. 1 is a schematic cross sectional view of an exemplary embodiment multi-layer enamel on a substrate.

The subject matter described herein provides multi-layered enamels and method of forming the enamels on substrates. The multi-layered enamels of the present subject matter comprise a multi-layered configuration that is relatively inexpensive and simple to produce, is durable, and exhibits good performance characteristics, while at the same time is more easily produced than with existing technology.

The enamels are multi-layered, wherein each layer is included for a specific benefit and imparts special characteristics to the enamel not available in single-layered enamels. The multi-layered enamels are adaptable to various intended uses and needs, and provide an economical and performance enhancing alternative to traditional production techniques. The various layers can be tailored for a specific purpose or environment by adjusting their composition, without significantly affecting the performance characteristics of the remaining layers.

Enamels

The present subject matter provides a multi-layered glass enamel having improved performance characteristics. Because typical enamels are single-layered coatings, any adjustment to the composition to affect a particular performance characteristic necessarily influences the entire coating and properties thereof. In some circumstances, the adjustment to affect one performance characteristic may also detrimentally affect other performance characteristics of the known single-layered enamels.

In contrast, the present subject matter provides a plurality of separate layers, built up to form a multi-layered enamel. The separate layers can be individually altered to affect a particular performance characteristic without changing the performance of the other layers. Each successive layer is printed upon the prior layer and fired. Digital printing techniques are an exemplary technique for depositing the separate layers in order to provide precise control of the pattern and thickness of the enamel. Ink compositions to be digitally printed are formulated for each layer and comprise a vehicle component and a solids component. The vehicle for the ink typically comprises a solvent and a resin binder if necessary, which are burned off during firing of the layers. The general composition for the vehicle will be discussed in more detail herein and is not necessarily formulated specifically to each layer. In contrast, the solids component for each ink composition is specifically tailored for each layer and will be discussed in more detail herein.

Typical uses for the multi-layered enamels as applied to glass substrates include automotive, architectural, structural, appliance, container, LED, and display/decoration applications. The multi-layered enamels can also be applied to ceramic, metal, polymers, and the like. The multi-layered enamels are also useful in covering conductive traces in electrical circuit boards and in rear defrost applications for automobiles glass and provide protection against abrasion and wear that could damage the electrical pathway. Moreover, in one aspect these opaque colored enamel have the ability to conceal silver-containing buss bars and wiring connections of rear glass defrosting systems from view from the outside of the vehicle.

The present subject provides a multi-layer enamel where each individual layer can be altered to tailor properties and characteristics of the fired enamel as a whole. The alteration of each layer does not change the performance characteristics of the other, separate layers. The enamel can be advantageously adapted by adding or taking out layers, by adjusting the components of one or more layers, or by adjusting the thickness of one or more layers. Each layer provides an improvement in the performance of the enamel and adjustment thereto addresses particular needs for a particular use and situation.

Generally, the fired enamels of the present subject matter comprise an interface layer, an opaque layer, and a durable layer. This arrangement is depicted in FIG. 1, showing a multi-layer enamel 1 bonded to a substrate 2. The enamel 1 comprises an interface layer 3 bonded to the surface 10 of the substrate. An opaque layer 4 is over the interface layer 3 and a durable layer 5 is over the opaque layer 4. The durable layer 5 is shown to define an exposed surface of the enamel 1. It is to be understood that when referencing the figures herein, numbers that are identical between figures represent features that are similar in the varying embodiments.

Figure 2:
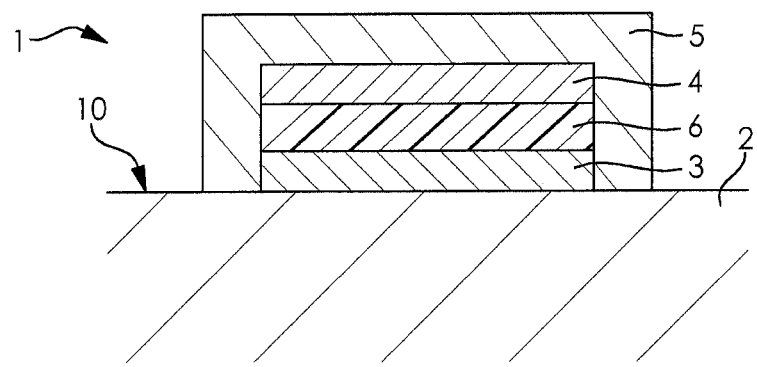
FIG. 2 is a schematic cross sectional view of another exemplary embodiment multi-layer enamel on a substrate.
Figure 3:
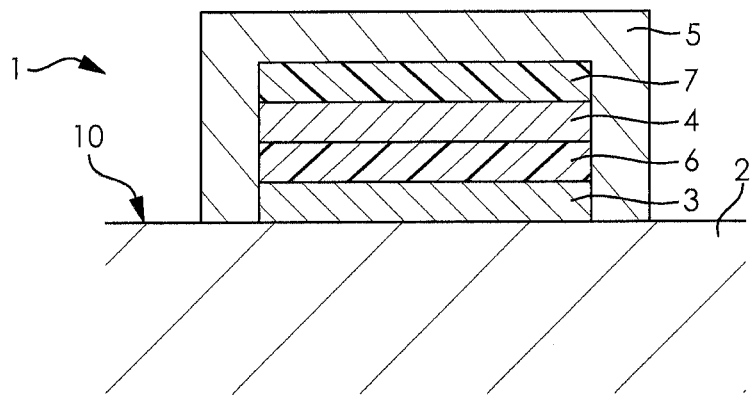
FIG. 3 is a schematic cross sectional view of still another exemplary embodiment multi-layer enamel on a substrate.
Figure 4:
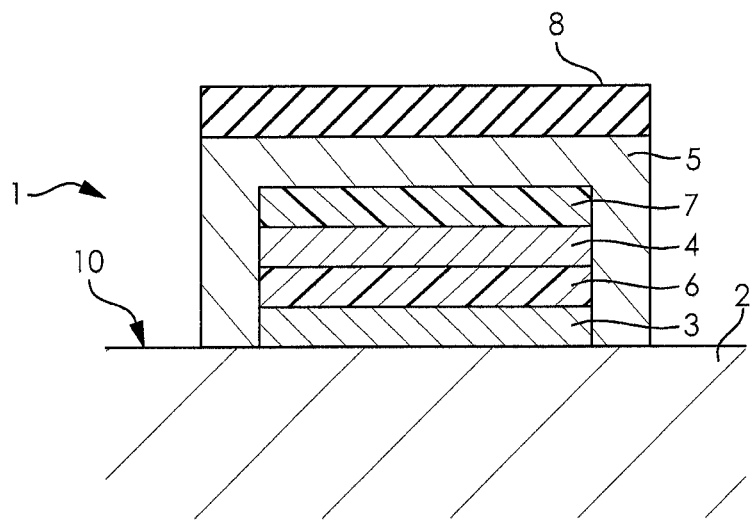
FIG. 4 is a schematic cross sectional view of yet another exemplary embodiment multi-layer enamel on a substrate.

Other additional layers can include a filler layer, a silver bleed through layer, and an anti-stick layer. These additional layers are depicted in FIGS. 2-4. FIGS. 2-4 show a multi-layer enamel 1 on a substrate 2 having similar arrangements as described for FIG. 1. FIG. 2 additionally shows a filler layer 6 between the interface layer 3 and the opaque layer 4. FIG. 3 is like FIG. 2 additionally including a silver bleed through layer 7 over the opaque layer 4. FIG. 4 is like FIG. 3 additionally including an anti-stick layer 8 over the durable layer 5. In one aspect of this embodiment, the interface layer is present from about 0% to about 20% by volume of the enamel, the filler layer is present from about 0% to about 20% by volume of the enamel, the opaque layer is present from about 10% to about 50% by volume of the enamel, the silver bleed through layer is present from about 0% to about 25% by volume of the enamel, the durable layer is present from about 10% to about 50% by volume of the enamel, and the anti-stick layer is present from about 0% to about 25% by volume of the enamel prior to firing.

These and other optional layers will be discussed in further detail herein. It will be understood that other arrangements of layers are contemplated and should be considered to be part of the present subject matter.

Although not limited to such, in one aspect the durable layer comprises a durable glass frit, which is normally high relative cost, while the inner layers of the enamel generally comprise a lower-cost, low melting glass frit. Limiting the higher-cost glass frit to the durable layer, and using lower-cost glass frit for the inner layers, provides a relatively inexpensive, yet durable and adaptable glass enamel.

It should be noted that the present subject matter is not limited to the composition or arrangement of layers as depicted and described herein and can incorporate additional or fewer layers or can be differently arranged as desired.

Interface Layer

The interface layer is the bottom most layer of the multi-layer enamel. The interface layer is tailored to adequately coat or "wet" the surface of a substrate and when fired, forms a strong bond therewith. The interface layer lies between the substrate and the other layers of the enamel as shown in FIGS. 1-4. Other layers of the enamel are not necessarily separated from the substrate by the interface layer and can come into contact with the substrate. For example, as generally shown in FIGS. 1-4, the durable layer contacts the substrate 2 as indicated in FIG. 1 at point 20.

The interface layer provides improved adhesion to the substrate as the interface layer can be tailored to adequately wet and strongly bond with specific substrate material, while at the same time not negatively affecting the overall performance of the enamel. This is so because the interface layer is responsible for bonding with the substrate and thus tailoring its composition will not affect other performance characteristics of the enamel, i.e., anti-stick, durability, etc.

The composition of the interface layer affects the adhesion and largely depends on the composition of the substrate to which the enamel is bonded. Generally the interface layer contains low cost, low melting glass frit. The interface layer and other layers generally have glass frit that is, but is not required to be, less durable and softer than glass frit used in the durable layer.

Specifically, in the case of ceramic and glass substrates, the glass frit comprises at least one oxide of boron, silicon, aluminum, titanium, zinc, bismuth, tin, barium, sodium, potassium, lithium, calcium, cobalt, chromium, cerium, copper, iron, germanium, magnesium, manganese, molybdenum, niobium, strontium, tungsten, zirconium. In the case of silicon solar cells, the glass frit comprises oxides at least one metal selected from the group consisting of silicon, lead, bismuth, aluminum, zinc, titanium, tantalum, phosphorous, alkali metals and alkaline earth metals. In the case of metal substrates, the glass frit comprises at least one oxide of boron, silicon, aluminum, titanium, zinc, bismuth, tin, barium, sodium, potassium, lithium, calcium, cobalt, nickel, chrome, cerium, copper, iron, germanium, magnesium, manganese, molybdenum, niobium, strontium, tungsten, and zirconium. In one aspect, a zinc borosilicate glass frit is used.

In one aspect the interface layer contains additives such as expansion modifiers to help reduce the potential thermal expansion differences between the substrate and the multi-layer enamel. Expansion modifiers suitable for the present subject matter are materials that have an area thermal expansion coefficient between that of the enamel and that of the substrate. When the interface layer can bridge the gap between the expansion coefficients of the enamel and substrate, a better and stronger bond is provided for the multi-layer enamel and the mechanical strength of the bonded substrate is improved.

Various expansion modifiers may be included in the interface layer composition in order to help ensure a good expansion match as between the resultant multi-layer enamel coating and the substrate. Examples of such modifiers include quartz, zirconia, spinels and mixtures thereof. Examples of such fillers or expansion modifiers include zinc silicates, magnesium silicates, barium silicates, strontium silicates, barium or strontium aluminum silicates, lithium alumino silicates, zirconium silicates, barium magnesium silicates, barium titanium silicates, cordierite, zirconia, alumina, silica, titania and mixtures of the foregoing. Typical expansion modifiers can also include $SiO_2$, $Al_2O_3$, $CaZrO_3$, $CaSiO_3$, $Mg_2SiO_4$, $CaTiO_3$, $BaZrO_3$, $SrZrO_3$, $Zr_2SiO_2$, and $CaSiO_3$. In one aspect, the expansion modifiers comprise cordierite, beta-eucryptite, zirconia, zircon and combinations thereof.

In one aspect, the interface layer includes a pigment. These pigments influence the color tone of the enamel as seen through a transparent or semi-transparent substrate and as seen through the other layers of the multi-layer enamel. The addition of pigment influences the see-through color of the enamel making it more aesthetically appealing. Useful pigments may come from several of the major classifications of complex inorganic pigments, including corundum-hematite, olivine, priderite, pyrochlore, rutile, spinel, and spinel, though other categories such as baddeleyite, borate, garnet, periclase, phenacite, phosphate, sphene and zircon may be suitable in certain applications. Oxides of the metals cobalt, chromium, manganese, praseodymium, iron, nickel, and copper are often useful. In particular, specific pigments include cobalt silicate blue olivine $Co_2SiO_4$; nickel barium titanium primrose priderite $2NiO:3BaO:17TiO_2$; nickel antimony titanium yellow rutile $(Ti,Ni,Nb)O_2$; nickel niobium titanium yellow rutile $(Ti,Ni,Nb)O_2$; nickel tungsten yellow rutile $(Ti,Ni,W)O_2$; chrome antimony titanium buff $(Ti,Cr,Sb)O_2$; chrome niobium titanium buff rutile $(Ti,Cr,Nb)O_2$; chrome tungsten titanium buff rutile $(Ti,Cr,W)O_2$; manganese antimony titanium buff rutile $(Ti,Mn,Sb)O_2$; titanium vanadium grey rutile $(Ti,V,Sb)O_2$; manganese chrome antimony titanium brown rutile $(Ti,Mn,Cr,Sb)O_2$; manganese niobium titanium brown rutile $(Ti,Mn,Nb)O2$; cobalt aluminate blue spinel $CoAl_2O_4$; zinc chrome cobalt aluminum spinel $(Zn,Co)(Cr,Al)_2O_4$; cobalt chromate blue-green spinel $CoCr_2O_4$; cobalt titanate green spinel $Co_2TiO4$; iron chromite brown spinel $Fe(Fe,Cr)_2O_4$; iron titanium brown spinel $Fe_2TiO_4$; nickel ferrite brown spinel $NiFe_2O_4$; zinc ferrite brown spinel $(Zn,Fe)Fe_2O_4$; zinc iron chromite brown spinel $(Zn,Fe)(Fe,Cr)_2O_4$; copper chromite black spinel $CuCr_2O_4$; iron cobalt chromite black spinel $(Co,Fe)(Fe,Cr)_2O_4$; chrome iron manganese brown spinel $(Fe,Mn)(Cr,Fe)_2O_4$; chrome iron nickel black spinel $(Ni,Fe)(Cr,Fe)_2O_4$; and chrome manganese zinc brown spinel $(Zn,Mn)(Cr_2O_4)$. Only in applications where lead is permitted (i.e., other than food or beverage containers, tableware, etc.), lead antimonite yellow pyrochlore $(Pb2Sb2O_7)$ or other lead-containing pigments may be used. Commercially available examples of suitable pigments are available from Ferro Glass and Color Corporation, such as 2991 pigment (copper chromite black), 2980 pigment (cobalt chromium iron black), 2987 pigment (nickel manganese iron chromium black), V7702 pigment (black), K393 (CuCrMn), V792(NiMnCrFe), 2503(CdSeS), 2336(CoAl), and 2501(CdSeS). In some embodiments, pigments free from Co, Cu, Cr, Ni and the like and having infrared reflecting properties, such a 10201 black (bismuth manganate) would also be suitable. Suitable exemplary inorganic pigments include mixed metal oxides of CuCr, CuCrMn, FeCrCo, $TiO_2$, and the like. Broadly, useful pigments herein include oxides comprising (a) copper and chromium; (b) copper, chromium, and manganese, (c) iron, chromium, and cobalt, and (d) titanium, and any combination of (a), (b), (c), and (d).

In an additional aspect, the interface layer further composes material that is capable of controlling unwanted interactions between the substrate and the enamel. For example, when an enamel is applied to a glass substrate, the interface layer comprises material to reduce ion exchange between the glass and the enamel. Ion exchange occurs where an alkali such as Na+ in the glass exchanges for a larger K+ or smaller Li+ ion in the enamel and creates surface stresses of tension or compression in the glass substrate exhibiting a structural weakening in that region of the substrate. With the interface layer controlling ion exchange, such controlled stress layers can be formed at the substrate-enamel interface. A stronger substrate and a more durable bond with the enamel results. In this aspect, alkali ions such as sodium and potassium may be included in the interface layer to control ion exchange.

In one aspect the interface layer is formed from a digitally printed and fired ink. The ink, prior to firing, has a solids portion comprising by weight, glass frit material from about 35% to about 95%, pigments from about 5% to about 65%, and expansion modifiers from about 2% to about 10%. Other optional components can be added to the interface layer as needed or desired for a particular application including the ion exchange control material.

The interface layer provides adjustable interaction with the substrate and its composition can be advantageously altered for specific purposes without degrading the other performance characteristics of the multi-layered enamel as a whole.

Filler Layer

In one embodiment, the filler layer is formed over the interface layer, wherein the interface layer is between the filler layer and the substrate. In one aspect, the filler layer is formed from a digitally printed and fired ink which may be fired at the same time as all other layers. The ink has a solids portion comprising prior to firing glass frit, pigments, and a filler component. The glass frit includes the same general low-cost, low melting glass frit as used in the interface layer as discussed previously herein. In one aspect the pigment used in the filler layer comprises the same pigments as discusses herein for the interface layer, although at a different weight percentage.

The filler component imparts added strength and wear-resistance to the multi-layered enamel. Non-limiting examples of suitable fillers include alumina ($Al_2O_3$), buss bar hiding control agents such as fine silicon powders (up to about 3% by weight), zircon, zirconia, cordierite ($2MgO.2Al_2O_3.5SiO_2$), willemite ($2ZnO.SiO_2$), beta-eucryptite ($LiAlSiO_4$), transition metal oxides such as FeO and silicon dioxide ($SiO_2$), and the like. Combinations of these are also in accordance with the present subject matter. In one aspect, the fillers are mixed homogeneously into the vehicle to make an homogeneous ink, but the ink may also be printed heterogeneously if desired, for example to obtain a composite having a gradient of some property.

In one aspect, the solids portion of the filler layer comprises by weight prior to firing, frit from about 5% to about 80%, pigments from 0% to about 50%, and filler component from about 2% to about 95%. Other optional components can be added to the filler layer as needed or desired for a particular application.

In one aspect, the filler layer is a separate and distinct layer from the other layers of the enamel. This configuration is shown in FIGS. 2-4 showing filler layer 6. In another aspect, the material used to form the filler layer is incorporated into the material used to form the opaque layer. This arrangement is shown in FIG. 1, showing no filler layer but only showing the opaque layer 4. It will be understood that FIG. 1 depicts an enamel having either a filler layer incorporated into the opaque layer 4 or an opaque layer 4 free of a filler layer component.

Opaque Layer

In one embodiment, the opaque layer is formed over the interface layer. In one aspect as depicted in FIG. 1, the opaque layer 4 contacts the interface layer 3. In another aspect as depicted in FIGS. 2-4, the opaque layer 4 is separated from the interface layer 3 by the filler layer 6. In one aspect the opaque layer is formed from a digitally printed and fired ink. The ink has a solids portion comprising glass frit, a high loading of pigment, and expansion modifiers. The glass frit, pigment, and expansion modifiers generally include the same materials as described herein for the interface and filler layers although in different weight percentages. In one embodiment, the glass frit used in the opaque layer comprises low-cost zinc or boron based glass frit. The expansion modifiers comprise cordierite, beta-eucryptite, zirconia, zircon, and combinations thereof.

In one embodiment, the solids portion of the opaque layer comprises by weight prior to firing, Zn and/or B frit from about 5% to about 60%, pigments from 40% to about 95%, and expansion modifiers from about 0% to about 15%. Other optional components can be added to the opaque layer as needed or desired for a particular application.

Silver Bleed Through Layer

In one aspect, the durable glass enamel of the present subject matter is situated in proximity to a silver conductive trace or circuit. In this aspect, the multi-layer enamel comprises a silver bleed through layer that has a silver migration control additive. This aspect is shown in FIGS. 3-4 where a silver bleed through layer 7 is over the opaque layer 4.

In one embodiment, the silver bleed through layer is formed from a digitally printed and fired ink with a solids portion containing material that reduces or prevents the migration of silver or other metal ions from the circuit, through the enamel, into the bulk of the substrate, or across the surface of the substrate. The solids portion of the silver bleed through layer contains silver migration control materials such as silicon, iron, or zinc metals, sulfur containing glass frits, and combinations thereof that are used for this purpose. Prior to firing, silicon, iron, or zinc metals may be contained from about 0.5 to 20% by weight in the silver bleed through layer. Glass frits containing from about 0.1 to about 5% sulfur in addition to other oxides such as silica, zinc oxide, boron oxide, aluminum oxide may be contained from about 10 to about 50% by weight in the silver bleed through layer.

Other optional components can be added to the silver bleed through layer as needed or desired for a particular application.

Durable Layer

In one embodiment, the durable layer forms the exposed portion of the multi-layer enamel and in combination with the substrate, substantially encapsulates the other layers that have been discussed herein. That is, the durable layer defines a covering over exposed portions of the other layers as shown in the figures. The durable layer thus provides improved wear and abrasion resistance for the finished enamel. In one aspect, the durable layer is formed from a digitally printed and fired ink. The ink has a solids portion comprising prior to firing durable glass frit and one or more pigments. The pigment generally includes the same materials as described for the other layers, although in different weight percentages.

The durable glass frit provides chemical corrosion protection and wear and abrasion protection for the underlying enamel layers. After the enamel is bonded to a substrate, the durable layer defines the exposed surface of the multi-layered enamel as shown in FIGS. 1-4. In one aspect, because high-cost, durable frits are used only in this layer, the cost of the overall enamel remains relatively low, while the durability is maintained. In this aspect, the frit component generally comprises prior to firing lead free, cadmium free, bismuth free low melting durable glass frit. The glass frit compositions comprise silica, zinc, titanium, and boron oxide based glass frits.

In one embodiment, the glass frit comprises prior to firing: (a) 38-60 wt % $SiO_2$, (b) 5.1-22.9 wt % $B_2O_3$, (c) 8.1-18 wt % $TiO_2$, (d) 0.1-14.9 wt % ZnO, (e) 0.1-4.5 wt % $Li_2O$ (f) 0.1-18 wt % $K_2O$, and (g) 1-7 wt % $F^{-1}$.

In another embodiment, the glass frit comprises prior to firing: (a) 40-70 wt % $Bi_2O_3$, (b) 25-40 wt % $SiO_2$, (c) 0-4 wt % $TiO_2$ (d) 0-5 wt % $K_2O$, (e) 0-4 wt % $Li_2O$, and (f) 0-4 wt % $F^{-1}$.

In another embodiment, the glass frit comprises prior to firing: (a) 40-70 wt % $Bi_2O_3$, (b) 25-40 wt % $SiO_2$, (c) 0-4 wt % $TiO_2$ (d) 0-5 wt % $K_2O$, (e) 0-4 wt % $Li_2O$, (f) 0-4 wt % $F^{-1}$, (g) 0-3 wt % $B_2O_3$, (h) 0-5 wt % $Al_2O_3$, and (i) 0-8 wt % $Na_2O$.

In another embodiment, the glass frit comprises prior to firing: (a) 38-60 wt % $SiO_2$, (b) 5.1-22.9 wt % $B_2O_3$, (c) 8.1-18 wt % $TiO_2$, (d) 0.1-14.9 wt % ZnO, (e) 0.1-4.5 wt % $Li_2O$, (f) 0.1-18 wt % $K_2O$, and (g) 1-7 wt % $F^{-1}$, Alternately, the $TiO_2$ content may be 10.5-18 wt %. Alternately, the $SiO_2$ content may be 20.1-22.9 wt %. Alternately, the ZnO content may be 13.1-14.9 wt %.

In one embodiment, the solids portion of the durable layer comprises by weight prior to firing, frits from about 60% to about 98%, and pigments from about 2% to about 40%. Other optional components can be added to the durable layer as needed or desired for a particular application.

Anti-Stick Layer

Specially formulated glass enamel compositions can be applied to planar sections of glass and fired to form opaque dark-colored enamel bands at the same time as the bending or forming operations were performed on the section of glass. Such glass enamel compositions can fuse and partially crystallize at the temperature at which a section of glass would be preheated preparatory to a bending or forming operation. It is believed that the partial crystallization of the enamel forms a dense, hard, protective layer that prevents the enamel from sticking to the press or vacuum head during the glass bending and transporting operations. In this respect, the present subject matter includes an anti-stick layer to address such concerns.

In one embodiment, the anti-stick layer is formed on the durable layer. FIG. 4 depicts an anti-stick layer 8 on a top surface of the durable layer 5. In one aspect, the anti-stick layer is formed from a digitally printed and fired ink whose solids portion comprises prior to firing crystalline seed materials, glass frits, and pigment. The pigment used herein is generally of the same type described for use in the other layers of the multi-layer enamel. In one aspect, the glass frit used herein is generally of the same type as described for the durable layer so that the anti-stick layer is also durable. In another aspect, the glass frit comprises bismuth borosilicate glass frit.

In one aspect, the crystalline seed material includes, without limitation, silicates, titanates, aluminates, zirconates, borates, clays, feldspars, or the like, and combinations thereof. Examples of suitable silicates include bismuth silicates, zinc silicates such as $Zn_2SiO_4$, aluminum silicates such as $Al_2SiO_5$, calcium silicates, and the like. Examples of suitable titanates include zinc titanates, such as $ZnTiO_3$, $2ZnO.3TiO_2$, and the like. Examples of suitable aluminates include $Al_2O_3$, $CaO.Al_2O_3.2SiO_2$, and the like. Examples of suitable zirconates are silicon zirconates, and the like. Examples of suitable borates include zinc borates such as $ZnO.B_2O_3$, $3ZnO.B_2O_3$, $5ZnO.2B_2O_3$, and the like. The crystalline materials may include combinations of theses seed materials.

U.S. Pat. No. 5,153,150 issued to Ruderer and U.S. Pat. No. 5,714,420 issued to Sakoske, provide further information on crystalline materials. Crystalline materials used in accordance with the present subject matter include zinc silicates such as $Zn_2SiO_4$ and zinc borosilicates such as $ZnO.B_2O_3$. Specific examples of seed materials used herein include product numbers 2077 (bismuth silicate seed material) and 2099 (zinc silicate seed material) manufactured by Ferro Glass and Color Corporation of Washington, Pa.

In one embodiment, the solids portion of the anti-stick layer comprises by weight prior to firing, crystalline seed material from about 5% to 100%, glass frit from 0% to about 70%, and pigment from 0% to about 60%. Other optional components can be added to the anti-stick layer as needed or desired for a particular application.

Vehicle

In one embodiment, the compositions are digitally printed and fired to form the individual layers of the multi-layer enamel according to the present subject matter. In this aspect, the compositions comprise prior to firing a suitable vehicle or carrier that facilitates application of the compositions to a section of glass or other suitable substrate. Depending upon the particular application, a composition for forming an individual layer of an enamel according to the present subject matter can be applied as a slurry, a paste, ink jet printable ink, as a thermoplastic pellet, or the like. In one aspect, the compositions are applied by digital printing techniques.

Digital printing techniques provide precise control of layer width and thickness, and allow for patterned enamel application on a substrate. Digital printing can also provide areas within the resulting enamel that have varying degrees of opacity, while at the same time maintaining uniform enamel thickness. This can be accomplished by varying the pigment component amount within a layer during the printing operation. This can provide portions of a layer having more or less pigment than other portions. Alternatively, this can be accomplished by simply using different compositions to form a single layer, the compositions containing varying amounts of pigment. For example, one ink composition can be used as one portion of a layer while a second ink composition—having more or less pigment—is used as another portion of the layer.

In another aspect, one or more layers can be omitted, or alternatively amplified, from one portion of the enamel to another, or from the enamel as a whole. This can be done to increase or decrease certain performance characteristics of the multi-layered enamel as desired.

In one embodiment, individual ink compositions are used to form each layer of the enamel. These layered ink compositions may be made from inks comprising individual components metered and mixed in a head or delivery system such that individual ink compositions for successive layers can be created. The solids portion of each layer is dispersed in a suitable vehicle or carrier. The vehicle comprises a carrier and/or solvent, and a resin binder if necessary. Examples of potential suitable solvents include terpenes such as alpha- or beta-terpineol or mixtures thereof with other solvents such as kerosene, dibutyl phthalate, butyl carbitol, butyl carbitol acetate, hexylene glycol and high-boiling alcohols and alcohol esters. Various combinations of these and other solvents may be formulated to obtain the desired viscosity and volatility requirements for digital printing.

Any essentially inert binder can be used in the practice of the present subject matter, including various organic liquids, with or without thickening and/or stabilizing agents and/or other common additives. Examples of potential suitable resin binders include ethyl cellulose, ethyl hydroxy ethyl cellulose, wood rosin, mixtures of ethyl cellulose and phenolic resins, polymethacrylates of lower alcohols and monobutyl ether of ethylene glycol monoacetate.

It will be appreciated that the vehicle may also, or alternatively comprise water and a water compatible binder. Any one of a number of commercially available water compatible binders may be utilized.

Optionally, the vehicle or carrier may also comprise a thixotrope and a wetting agent in order to facilitate the application of the enamel compositions to the substrate. Examples of potential suitable thixotropic agents include organic based thixotropics such as, for example, hydrogenated castor oil and derivatives thereof and ethyl cellulose. Examples of potential suitable wetting agents include fatty acid esters, for example, N-tallow-1, 3-diaminopropane di-oleate, N-tallow trimethylene diamine diacetate, N-coco trimethylene diamine, beta diamines, N-oleyl trimethylene diamine, N-tallow trimethylene diamine, and/or N-tallow trimethylene diamine di-oleate.

In one embodiment of the present subject matter, the vehicle contains prior to firing, from about 0.1% to about 20% by weight resin binder and about 80% to about 99.9% by weight solvent or mixture of solvents. The binder can include a thixotropic material, at a concentration of less than about 0.25% by weight. The viscosity of the digitally printable inks are adjusted by changing the ratio of solvent to binder, and by adjusting the ratio of the vehicle portion of the ink to the solids portion as needed for a particular layer. In one aspect, the viscosity of each ink composition for digital printing is from 1 to 2,000 centipoise at 20° C.

Other Optional Layers and Components

The multi-layered enamel of the present subject matter is not limited to the layers mentioned previously herein, but can include other optional layers to improve the functionality of the enamel. Other optional layers for the multi-layer enamel can include heat reflective layers, emissivity control layers, infrared reflective layers, color correction layers, and the like.

Besides the components described herein for each layer, other optional components can be included into the compositions. Such additional components can include metal or metal powder (separately from any oxide), carbides, nitrides, surfactants, rheological modifiers, flow aids, adhesion promoters, or light and UV stabilizers.

Methods

The present subject matter relates to methods of forming the multi-layer enamel that has been previously described herein. In one embodiment, the method includes depositing an interface layer to the surface of a substrate; forming an opaque layer over the interface layer, layering a durable layer over the opaque layer, and firing the layers to thereby form the enamel. The method produces an enamel with an exposed surface, wherein the durable layer forms the exposed surface of the enamel.

The interface layer is formed from an interface material, the content of which has been previously discussed herein when describing the interface layer. Such content is incorporated herein for the interface material. Generally, the interface material comprises prior to firing, glass frit from about 35 wt % to about 95 wt %, pigment from about 5 wt % to about 65 wt %, and an expansion modifier from about 2 wt % to about 10 wt %. In one embodiment the glass frit comprises a lead free zinc borosilicate frit with an approximate range of components prior to firing:

(a) 0-75 wt % $Bi_2O_3$,
(b) 5-60 wt % $SiO_2$,
(c) 0-25 wt % $B_2O_3$,
(d) 0-3.9 wt % $Al_2O_3$,
(e) 0-8 wt % $TiO_2$,
(f) 0-35 wt % ZnO,
(g) 0-4 wt % $ZrO_2$,
(h) 0-7 wt % $F^{-1}$,
(i) 0.1-13 wt % $Na_2O$,
(j) 0-18 wt % $K_2O$,
(k) 0-4 wt % $Li_2O$, and
(l) other optional modifier oxides.

The pigment is selected from the group consisting of mixed metal oxides of CuCr, CuCrMn, FeCrCo, $TiO_2$, and combinations thereof. The expansion modifier is selected from the group consisting of cordierite, beta-eucryptite, zirconia, zircon, and combinations thereof.

In one aspect, the interface material is digitally printed on the surface of the substrate. In this method the interface material further includes a vehicle comprising a solvent and/or carrier, and a binder if necessary. After digitally printing the interface material onto the surface of the substrate, the solvent is removed from the interface material, or substantially so, in order to form the interface layer. A drying step may be necessary to substantially remove the solvent, or alternatively the solvent may be such that it is not necessary to have a separate drying step.

The method further includes forming an opaque layer over the interface layer. The opaque layer is formed from an opaque material, the content of which has been previously discussed herein when describing the opaque layer. Such content is incorporated herein for the opaque material. Generally, the opaque material comprises prior to firing, glass frit from about 5 wt % to about 60 wt %, pigment from about 40 wt % to about 95 wt %, and an expansion modifier from about 0 wt % to about 15 wt %. In one embodiment, the glass frit in the opaque material is selected from the group consisting of boron based glass frit, zinc based glass frit, and combinations thereof; the pigment in the opaque material is selected from the group consisting of mixed metal oxides of CuCr, CuCrMn, FeCrCo, $TiO_2$, and combinations thereof; and the expansion modifier in the opaque material is selected from the group consisting of cordierite, beta-eucryptite, zirconia, zircon, and combinations thereof.

In one embodiment, the opaque material is digitally printed, and in this method the opaque material further comprises a solvent and a binder. After digitally printing the opaque material over the interface layer, the opaque material is dried to substantially remove the solvent and to form the opaque layer over the interface layer.

The method further includes layering a durable layer over the opaque layer. The durable layer is formed from a durable material, the content of which has been previously discussed herein when describing the durable layer. Such content is incorporated herein for the durable material. Generally, the durable material comprises glass frit from about 60 wt % to about 98 wt %, and pigment from about 2 wt % to about 40 wt %.

In one embodiment, the glass frit in the durable material is selected from the group consisting of composition 1, composition 2, composition 3, composition 4, composition 5, and combinations thereof. Composition 1 comprises prior to firing:
- (a) 38-60 wt % $SiO_2$,
- (b) 5.1-22.9 wt % $B_2O_3$,
- (c) 8.1-18 wt % $TiO_2$,
- (d) 0.1-14.9 wt ZnO,
- (e) 0.1-4.5 wt % $Li_2O$,
- (f) 0.1-18 wt % $K_2O$, and
- (g) 1-7 wt % $F^{-1}$.

Composition 2 comprises prior to firing:
- (a) 40-70 wt % $Bi_2O_3$,
- (b) 25-40 wt % $SiO_2$,
- (c) 0-4 wt % $TiO_2$,
- (d) 0-5 wt % $K_2O$,
- (e) 0-4 wt % $Li_2O$, and
- (f) 0-4 wt % $F^{-1}$.

Composition 3 comprises prior to firing:
- (a) 40-70 wt % $Bi_2O_3$,
- (b) 25-40 wt % $SiO_2$,
- (c) 0-4 wt % $TiO_2$
- (d) 0-5 wt % $K_2O$,
- (e) 0-4 wt % $Li_2O$,
- (f) 0-4 wt % $F^{-1}$,
- (g) 0-3 wt % $B_2O_3$,
- (h) 0-5 wt % $Al_2O_3$, and
- (i) 0-8 wt % $Na_2O$.

Composition 4 comprises prior to firing:
- (a) 38-60 wt % $SiO_2$,
- (b) 5.1-22.9 wt % $B_2O_3$,
- (c) 8.1-18 wt % $TiO_2$,
- (d) 0.1-14.9 wt % ZnO,
- (e) 0.1-4.5 wt % $Li_2O$,
- (f) 0.1-18 wt % $K_2O$, and
- (g) 1-7 wt % $F^{-1}$.

Composition 5 comprises prior to firing:
- (a) 20.1-22.9 wt % $SiO_2$,
- (b) 5.1-22.9 wt % $B_2O_3$,
- (c) 10.5-18 wt % $TiO_2$,
- (d) 13.1-14.9 wt % ZnO,
- (e) 0.1-4.5 wt % $Li_2O$,
- (f) 0.1-18 wt % $K_2O$, and
- (g) 1-7 wt % $F^{-1}$.

In one aspect, the pigment in the durable material is selected from the group consisting of mixed metal oxides of CuCr, CuCrMn, FeCrCo, $TiO_2$, and combinations thereof.

In one embodiment, the durable material is digitally printed over the opaque layer. In this digital printing method the durable material further comprises a solvent and/or carrier and a binder if necessary. After digitally printing the durable material over the opaque layer, the durable material is dried to substantially remove the solvent and to form the durable layer over the opaque layer. In one aspect, the durable layer is formed over the opaque layer so that the durable layer forms the exposed surface of the multi-layer enamel.

The method further includes generating a filler layer over the interface layer. In one aspect, the filler layer is between the interface layer and the opaque layer. In another aspect, the filler layer is part of the opaque layer. The filler layer is formed from a filler material, the content of which has been previously discussed herein when describing the filler layer. Such content is incorporated herein for the filler material. Generally, the filler material comprises prior to firing, glass frit from about 5 wt % to about 80 wt %, a filler component from about 20 wt % to about 95 wt %, and pigment from 0 wt % to about 50 wt %. In one aspect, the glass frit in the filler material comprises zinc borosilicate glass frit; the filler component in the filler material is selected from the group consisting of alumina, silicon powder, zircon, zirconia, cordierite, willemite, beta-eucryptite, transition metal oxides, silicon dioxide, and combinations thereof; and the pigment in the filler material is selected from the group consisting of mixed metal oxides of CuCr, CuCrMn, FeCrCo, $TiO_2$, and combinations thereof.

In one aspect, the filler material is digitally printed. In this digital printing method the filler material further comprises a solvent and/or carrier and a binder if necessary. After digitally printing the filler material, the filler material is dried to substantially remove the solvent and to form the filler layer.

The method further includes producing a silver bleed through layer over the opaque layer. The silver bleed through layer is formed from a silver bleed through material, the content of which has been previously discussed herein when describing the silver bleed through layer. Such content is incorporated herein for the silver bleed through material. Generally, the silver bleed through material comprises a silver migration control additive selected from the group consisting of silicon metal, iron metal, zinc metal, sulfur containing glass frit, and combinations thereof.

In one aspect, the silver bleed through material is digitally printed over the opaque layer. In this digital printing method the silver bleed through material further comprises a solvent and/or carrier and a binder if necessary. After digitally printing the silver bleed through material, the silver bleed through material is dried to substantially remove the solvent and to form the silver bleed through layer.

The method further includes producing an anti-stick layer over the durable layer. The anti-stick layer is formed from an anti-stick material, the content of which has been previously discussed herein when describing the anti-stick layer. Such content is incorporated herein for the anti-stick material. Generally, the anti-stick material comprises a crystalline seed material from about 5 wt % to 100 wt %, glass frit from 0 wt % to about 70 wt %, and pigment from 0 wt % to about 60 wt %. In one aspect, the crystalline seed material is selected from the group consisting of silicates, titanates, aluminates, zirconates, borates, clays, feldspars, and combinations thereof; the glass frit in the anti-stick material comprises bismuth borosilicate glass frit; and the pigment in the anti-stick material is selected from the group consisting of mixed metal oxides of CuCr, CuCrMn, FeCrCo, $TiO_2$, and combinations thereof. In one aspect, the glass frit can comprise glass frits according to composition 1-5 as described for the durable layer.

In one aspect, the anti-stick material is digitally printed over the opaque layer. In this digital printing method the anti-stick material further comprises a solvent and/or carrier and a binder if necessary for green strength. After digitally printing the anti-stick material, the anti-stick material is dried to substantially remove the solvent and to form the anti-stick layer.

The firing operation of the disclosed method includes heating the layers to burn off the binder and any remaining solvent, melt and flow the glass frit, and a subsequent cooling of the glass frit to fuse the glass to form the multi-layered enamel. The firing operation can be performed separately for each layer, e.g., before the next layer is deposited or before all the layers are deposited. Alternatively, the firing operation can be performed in one step for all the layers, e.g., after all the layers have been deposited.

While digital printing is used in one embodiment to deposit the various ink materials, it is also contemplated that other various techniques can be used to deposit the material and form the individual layers of the multi-layer enamel.

When each layer is applied by digital printing, the foregoing solid ingredients for each layer are combined with an organic vehicle or carrier to form an ink. In one aspect, the ink for each layer in general, contains prior to firing about 20-60 wt % solids portion, and about 40-80 wt % of a vehicle portion. The viscosity of the inks is adjusted for the particular layer to be formed and solids to be included, so that the ink for each layer can be digitally printed in a desired manner and thickness onto the desired substrate.

The organic vehicle for the pastes comprises a binder and a solvent, which are selected based on the ability to maintain a stable ink, viscosity, and burn off characteristics. The vehicle suspends the solids portion during printing and then completely burns off, or substantially so, upon firing. In particular, binders including methyl cellulose, ethyl cellulose, and hydroxypropyl cellulose, and combinations thereof, may be used. Suitable solvents include propylene glycol, diethylene glycol butyl ether; 2,2,4-trimethyl pentanediol monoisobutyrate (Texanol™); alpha-terpineol; beta-terpineol; gamma terpineol; tridecyl alcohol; diethylene glycol ethyl ether (Carbitol™), diethylene glycol butyl ether (Butyl Carbitol™); pine oils, vegetable oils, mineral oils, low molecular weight petroleum fractions, tridecyl alcohols, and synthetic or natural resins and blends thereof. Surfactants and/or other film forming modifiers can also be included. The solvent and binder may be present in a weight ratio of about 50:1 to about 20:1. In one aspect, the vehicle comprises a combination of water and phosphoric acid polyesters in a weight ratio of about 1 to 3.

The viscosity of the ink material for each layer to be digitally printed range from 10 to 20,000 centipoise at 20° C., as determined on a Brookfield Viscometer, #29 spindle at 10 rpm, are appropriate.

Enamel Coated Substrates

The present subject matter multi-layer enamels can be bonded to any number of various substrates. As discussed previously, the substrates to be coated with the enamel are not particularly limited and can included glass/ceramic substrates, metal substrates, and silicon substrates (such as for solar cells) as non-limiting examples. In regard to glass substrates, the glass can be automotive glass, architectural glass, and display glass as non-limiting examples.

Many other benefits will no doubt become apparent from future application and development of this technology. All patents and printed publications cited herein are hereby incorporated by reference in their entirety.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scopes of the claimed subject matter, as expressed in the appended claims.

What is claimed is:

1. A method of forming a multi-layered enamel, comprising:
   forming an interface layer on a surface of a glass substrate, the interface layer being formed by depositing and firing an interface material comprising from about 35 wt % to about 95 wt % glass frit, from about 5 wt % to about 65 wt % pigment, and from about 2 wt % to about 10 wt % expansion modifier,
   forming an opaque layer disposed on the interface layer, the opaque layer being formed by deposition and firing of an opaque material comprising from about 5 wt % to about 60 wt % glass frit, from about 40 wt % to about 95 wt % pigment, and from about 0 wt % to about 15 wt % expansion modifier, and
   forming a durable layer disposed on the opaque layer, the durable layer being formed by formed by deposition and firing of a durable material comprising from about 60 wt % to about 98 wt % glass frit, and from about 2 wt % to about 40 wt % pigment,
   wherein the durable layer defines an exposed surface of the multi-layer enamel.

2. The method according to claim 1, wherein:
   each of the interface material, the opaque material, and the durable material further comprises a solvent and a binder; and
   deposition comprises digitally printing each of the interface material, the opaque material, and the durable material and drying to remove the solvent therefrom.

3. The method according to claim 1, wherein firing of each of the interface material, the opaque material, and the durable material is performed simultaneously.

4. The method according to claim 1, wherein firing of each of the interface material, the opaque material, and the durable material is performed separately.

5. The method according to claim 1, wherein:
   the glass frit of the interface material comprises zinc borosilicate glass frit, the pigment of the interface material is selected from the group consisting of mixed metal oxides of CuCr, CuCrMn, FeCrCo, $TiO_2$, and combinations thereof, and
   the expansion modifier of the interface material is selected from the group consisting of cordierite, beta-eucryptite, zirconia, zircon, and combinations thereof.

6. The method according to calm 5, wherein the interface material further includes ion exchange control material including at least one of sodium ions or potassium ions.

7. The method according to claim 1, wherein:
   the glass frit of the opaque material is selected from the group consisting of boron based glass frit, zinc based glass frit, and combinations thereof,
   the pigment of the opaque material is selected from the group consisting of mixed metal oxides of (a) copper and chromium; (b) copper, chromium, and manganese, (c) iron, chromium, and cobalt, and (d) titanium, and any combination of (a), (b), (c), and (d), and
   the expansion modifier of the opaque material is selected from the group consisting of cordierite, beta-eucryptite, zirconia, zircon, and combinations thereof.

8. The method according to claim 1, wherein the pigment of the durable material is selected from the group consisting of mixed metal oxides of CuCr, CuCrMn, FeCrCo, $TiO_2$, and combinations thereof, and the glass frit in the durable material is selected from the group consisting of composition 1, composition 2, composition 3, composition 4, composition 5, and combinations thereof, wherein:

composition 1 comprises:
(a) 38-60 wt % $SiO_2$,
(b) 5.1-22.9 wt % $B_2O_3$,
(c) 8.1-18 wt % $TiO_2$,
(d) 0.1-14.9 wt % ZnO,
(e) 0.1-4.5 wt % $Li_2O$
(f) 0.1-18 wt % $K_2O$, and
(g) 1-7 wt % $F_{-1}$;

composition 2 comprises:
(a) 40-70wt % $Bi_2O_3$,
(b) 25-40 wt % $SiO_2$,
(c) 0-4 wt % $TiO_2$,
(d) 0-5 wt % $K_2O$,
(e) 0-4 wt % $Li_2O$, and
(f) 0-4 wt % $F_{-1}$;

composition 3 comprises:
(a) 40 - 70 wt % $Bi_2O_3$,
(b) 25 - 40 wt % $SiO_2$,
(c) 0-4wt % $TiO_2$
(d) 0-5 wt % $K_2O$,
(e) 0-4 wt % $Li_2O$,
(f) 0-4 wt % $F_{-1}$,
(g) 0-3 wt % $B_2O_3$,
(h) 0-5 wt % $Al_2O_3$, and
(i) 0-8 wt % $Na_2O$;

composition 4 comprises:
(a) 38-60 wt % $SiO_2$,
(b) 5.1-22.9 wt % $B_2O_3$,
(c) 8.1-18 wt % $TiO_2$,
(d) 0.1-14.9 wt % ZnO,
(e) 0.1-4.5 wt % $Li_2O$,
(f) 0.1-18 wt % $K_2O$, and
(g) 1-7 wt % $F_{-1}$; and composition 5 comprises:
(a) 20.1-22.9 wt % $SiO_2$,
(b) 5.1-22.9 wt % $B_2O_3$,
(c) 10.5-18 wt % $TiO_2$,
(d) 13.1-14.9 wt % ZnO,
(e) 0.1-4.5 wt % $Li_2O$,
(f) 0.1-18 wt % $K_2O$, and
(g) 1-7 wt % $F^{-1}$.

9. The method according to claim 1, further including depositing and firing a filler material comprising:
glass frit from about 5 wt % to about 80 wt %, pigment from 0 wt % to about 50 wt %, and
a filler component from about 20 wt % to about 95 wt % and selected from the group consisting of alumina, silicon powder, zircon, zirconia, cordierite, willernite, beta-eucryptite, and transition metal oxides, silicon dioxide, and combinations thereof,
wherein the filler material is deposited and fired to form a filler layer between the interface layer and the opaque layer, or is deposited and fired as part of the opaque layer.

10. The method according to claim 9, wherein:
the glass frit in the filler material comprises zinc borosilicate glass frit, the pigment in the filler material is selected from the group consisting of mixed metal oxides of (a) copper and chromium; (b) copper, chromium, and manganese, (c) iron, chromium, and cobalt, and (d) titanium, and any combination of (a), (b), (c), and (d), and combinations thereof.

11. The method according to claim 1, further including forming a silver bleed through layer between the opaque layer and the durable layer, the silver bleed through layer being formed by depositing and firing a silver bleed through material comprising glass frit and a silver migration control additive selected from group consisting of sulfur, silicon metal, iron metal, zinc metal, and combinations thereof.

12. The method according to claim 1, further including forming an anti-stick layer on the durable layer, the anti-stick layer being formed by depositing and firing an anti-stick material comprising a crystalline seed material from about 5 wt % to 100 wt %, glass frit from 0 wt % to about 70 wt %, and pigment from 0 wt % to about 60 wt %.

13. The method according to claim 12, wherein:
the glass frit in the anti-stick material comprises bismuth borosilicate glass frit, the pigment in the anti-stick material is selected from the group consisting of mixed metal oxides of CuCr, CuCrMn, FeCrCo, $TiO_2$, and combinations thereof, and
the crystalline seed material is selected from the group consisting of silicates, titanates, aluminates, zirconates, borates, clays, feldspars, and combinations thereof.

14. The method according to claim 1, wherein the substrate is automotive glass and the method further includes heating and bending the automotive glass after the multi-layered enamel is formed thereon.

15. A glass substrate coated with a multi-layer enamel, wherein the multi-layer enamel comprises a fired assembly of a substrate, an interface layer, an opaque layer, and a durable layer, wherein
the interface layer is bonded to the substrate, the interface layer comprising prior to firing:
from about 35 wt % to about 95 wt % glass frit,
from about 5 wt % to about 65 wt % pigment, and
from about 2 wt % to about 10 wt % expansion modifier;
the opaque layer is bonded to the interface layer, the opaque layer comprising prior to firing:
from about 5 wt % to about 60 wt % glass frit,
from about 40 wt % to about 95 wt % pigment, and
from about 0 wt % to about 15 wt % expansion modifier, and
a durable layer over the opaque layer;
the durable layer being formed by depositing and firing a durable material comprising glass frit
from about 60 wt % to about 98 wt %, and pigment from about 2 wt % to about 40 wt %, and
wherein
the enamel has an exposed portion and the durable layer defines the exposed portion.

* * * * *